United States Patent
Cumer et al.

(10) Patent No.: US 9,873,235 B2
(45) Date of Patent: Jan. 23, 2018

(54) DISTRIBUTION UNIT FOR A PARTICULATE MATERIAL

(71) Applicant: MARANGONI S.P.A., Rovereto (IT)

(72) Inventors: Alessandro Cumer, Rovereto (IT); Daniele Morani, Rovereto (IT)

(73) Assignee: Marangoni S.P.A., Rovereto (IT)

(*) Notice: Subject to any disclaimer, the term of this patent is extended or adjusted under 35 U.S.C. 154(b) by 0 days.

(21) Appl. No.: 15/306,766

(22) PCT Filed: Apr. 20, 2015

(86) PCT No.: PCT/IB2015/052867
§ 371 (c)(1),
(2) Date: Oct. 27, 2016

(87) PCT Pub. No.: WO2015/166374
PCT Pub. Date: Nov. 5, 2015

(65) Prior Publication Data
US 2017/0050397 A1 Feb. 23, 2017

(30) Foreign Application Priority Data
Apr. 28, 2014 (IT) .............................. VR2014A0105

(51) Int. Cl.
| | | |
|---|---|---|
| *B29D 30/54* | (2006.01) | |
| *B05C 19/04* | (2006.01) | |
| *B05B 7/14* | (2006.01) | |
| *B05C 19/00* | (2006.01) | |
| *B05B 12/08* | (2006.01) | |
| *B29D 30/72* | (2006.01) | |
| *B29K 105/00* | (2006.01) | |

(52) U.S. Cl.
CPC ............ *B29D 30/54* (2013.01); *B05B 7/1404* (2013.01); *B05B 7/1454* (2013.01); *B05B 7/1486* (2013.01); *B29D 30/72* (2013.01); *B05B 12/085* (2013.01); *B05C 19/00* (2013.01); *B05C 19/04* (2013.01); *B29D 2030/541* (2013.01); *B29D 2030/726* (2013.01); *B29K 2105/251* (2013.01)

(58) Field of Classification Search
CPC ... B05C 19/00; B05C 19/04; B29D 2030/541; B29D 2030/726; B29D 30/54; B29D 30/72; B29K 2105/251; B05B 7/1404; B05B 7/1454; B05B 7/1486; B05B 12/085
USPC ........ 118/300, 304, 308; 239/690, 693, 704, 239/708
See application file for complete search history.

(56) References Cited

U.S. PATENT DOCUMENTS

| | | | | |
|---|---|---|---|---|
| 3,244,162 A | * | 4/1966 | Rademacher | ......... B24B 53/007 125/11.01 |
| 3,724,416 A | * | 4/1973 | Diamond | .............. B05B 5/1683 118/312 |

(Continued)

FOREIGN PATENT DOCUMENTS

EP 943372 * 9/1999

*Primary Examiner* — Laura Edwards
(74) *Attorney, Agent, or Firm* — PatShegen IP

(57) ABSTRACT

A distribution unit (U) for distribution carbonaceous particulate material, in particular powdered rubber or equivalent material to be applied on the peripheral surfaces (F) of a tire (P), comprises nozzle diffuser (2) for spreading said particulate material and pneumatic supply (1,3,5,7) for feeding said particulate material to said nozzle diffuser (2).

3 Claims, 3 Drawing Sheets

(56) References Cited

U.S. PATENT DOCUMENTS

| | | | | |
|---|---|---|---|---|
| 3,799,438 A | * | 3/1974 | Shockley | B05B 13/02 |
| | | | | 239/336 |
| 4,356,214 A | * | 10/1982 | Soeda | B29D 30/0633 |
| | | | | 152/504 |
| 5,702,209 A | * | 12/1997 | Mauchle | B05B 12/085 |
| | | | | 406/12 |
| 2010/0068410 A1 | * | 3/2010 | Jensen | C23C 24/04 |
| | | | | 427/554 |

* cited by examiner

DISTRIBUTION UNIT FOR A PARTICULATE MATERIAL

The present invention relates to a unit for the application and distribution of a carbonaceous particulate material of rubber articles.

The subject invention is advantageously used during the process of production of tyres for vehicles in general, such as industrial and/or commercial vehicles as trucks, buses and the like, in particular retreaded tyres, to which the following description will make explicit reference without losing its generality.

In general, the process of production of retreaded tires from worn tires substantially consists in a previous removal from a tyre of a worn tread through a process of buffing, by applying through a distribution assembly a layer (substrate) of extruded rubber or compound in viscous form on the carcass, also including its sidewalls, of the cleaned tire to define a covering surface adapted to support a new tread, and produce the new tread, for example through a rotary machine which applies a further new layer or band of crude rubber to be molded and cured, or through further application on the cover of a previously molded and already cured tread.

To facilitate and optimize the molding step of identification and information codes (type, size, tire brand etc.) on the peripheral side surfaces or sidewalls the retreaded tyre itself and to avoid an unwanted sticking between adjacent tyres during subsequent processing steps, a substance or a carbonaceous particulate material is applied and distributed, in particular rubber powder also called "dust". Currently the cited application and distribution of rubber dust, which is a very thin and highly volatile particulate substance, is performed manually by an operator through the use of brushes, sponges or similar tools.

Moreover, very often the rubber powder so widespread is not properly uniformly distributed, and portions of such dust in some cases deposit on portions of the carcass intended for application of the crude compound, with consequent undesirable subsequent detachment of the compound itself.

According to U.S. Pat. No. 3,724,416 and to U.S. Pat. No. 5,702,209 it's known a unit for distribution carbonaceous particulate material comprising nozzle means for spreading particulate material and pneumatic supply means for feeding such particulate material to the nozzle means.

The object of the present invention is therefore to eliminate the drawbacks of the prior art highlighted above.

In particular, an object of the present invention is to provide a unit capable of realizing the automatic and controlled distribution of the carbonaceous particulate material or rubber dust on retreaded tyres without risk of dispersion in the air of quantities of powder.

Another object of the present invention is to provide a unit through which the molding step of identification/information codes on the whole surface of the sidewalls of tyres is made more safe and without molding defects.

The structural and functional characteristics of the present invention and its advantages compared to the known art will be even clearer and more evident from claims below, and in particular through an examination of the following description, with reference to the annexed drawings, which shows a preferred schematic but not limiting embodiment of a distribution unit of a particulate carbonaceous material, in which:

Figure 2:
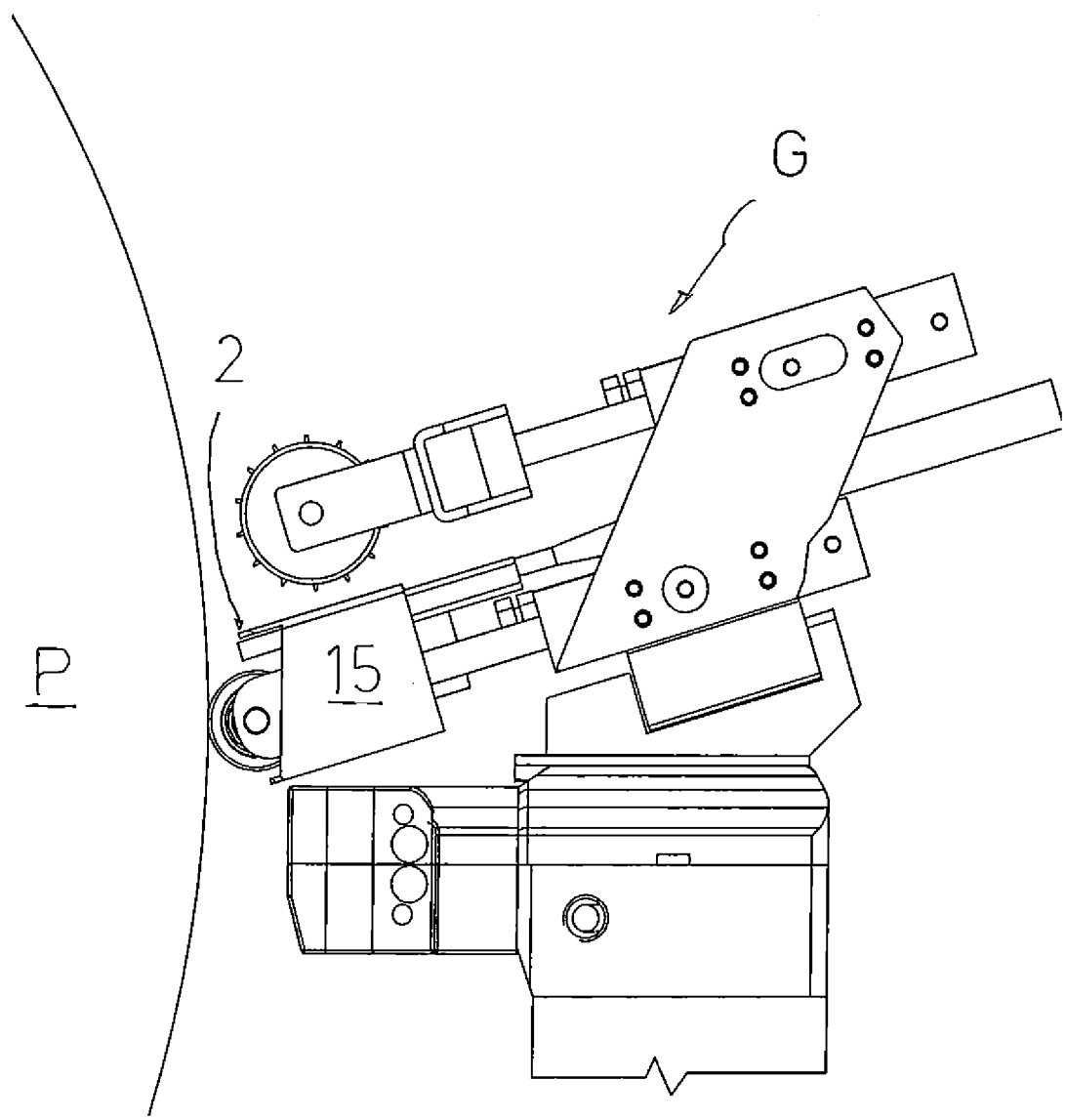
FIG. 2 is a side view of a distribution assembly supporting an operative component of the subject unit according to the present invention.
Figure 3:
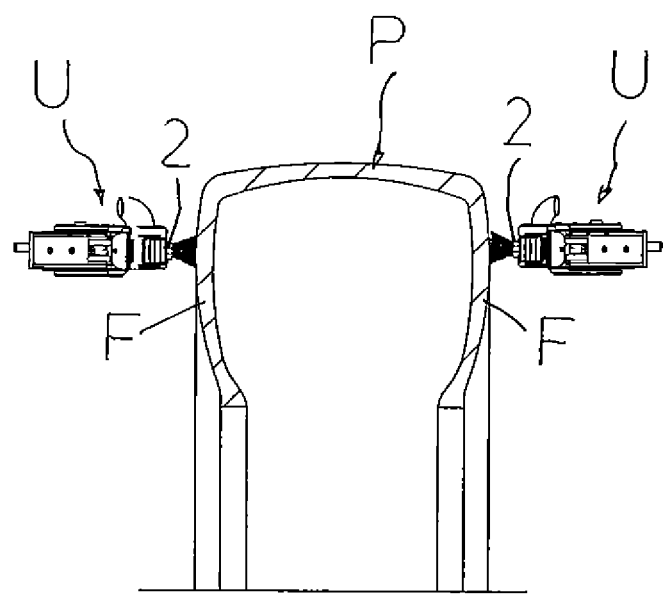
FIG. 3 is a front (sectioned) view of an operating component of the subject unit acting on both side surfaces of a tyre.

With reference to annexed Figures, U globally indicates a distribution unit of a carbonaceous particulate material, such for example rubber dust or equivalent material, on the peripheral surfaces of a tyre P (FIGS. 2 and 3) for motor vehicles in general, such as industrial and/or commercial vehicles as trucks, buses and the like, in particular on the peripheral side surfaces or sidewalls F of a retreated tire P (FIG. 3).

Figure 1:
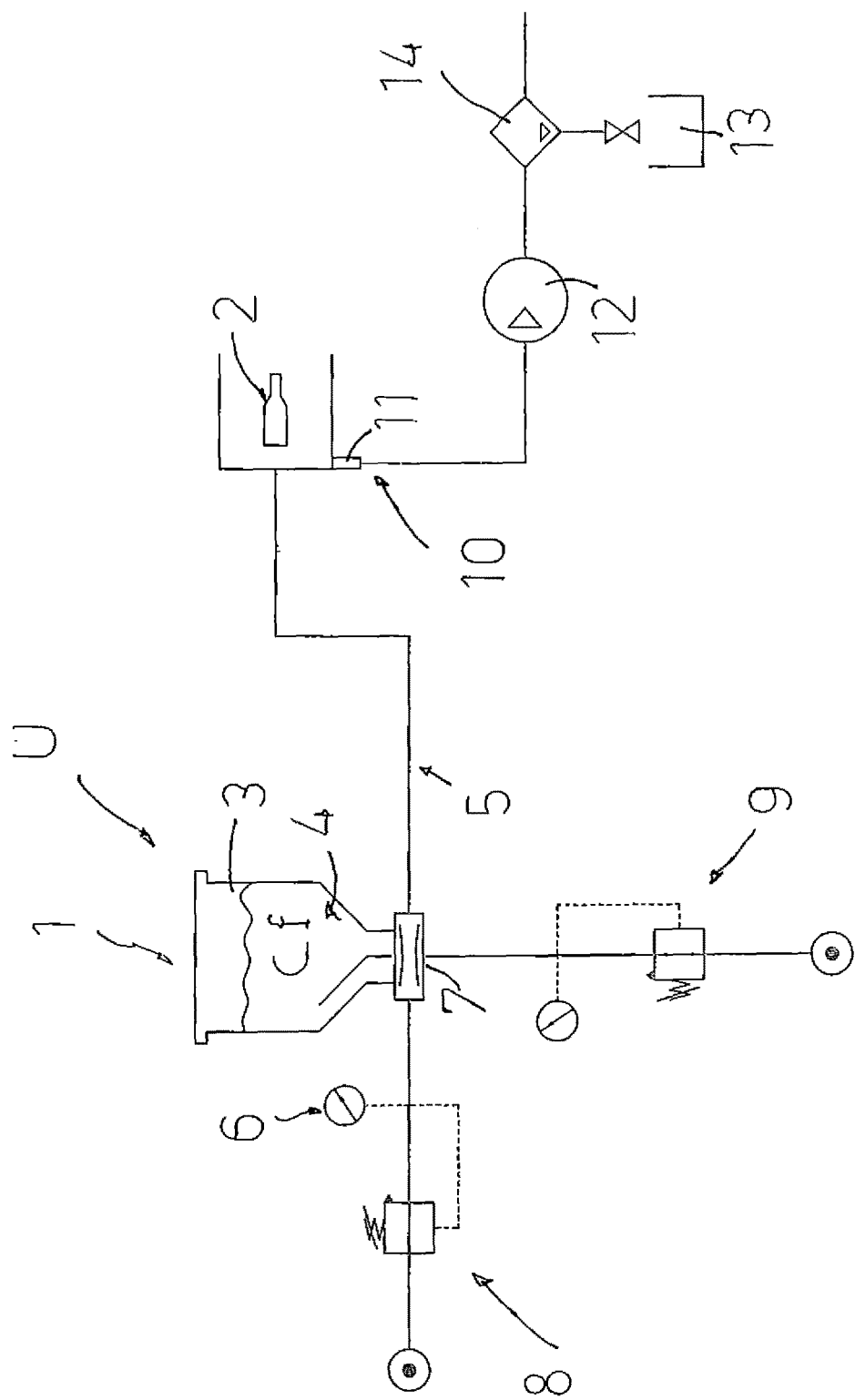
FIG. 1 is a schematic constructive view of a preferred embodiment of the subject unit according to the present invention.

According to the schematic shown in FIG. 1, the unit U comprises a pneumatic supply assembly 1 of rubber dust to a nozzle diffuser 2, capable in use to spread and/or spray rubber dust on the sides F of the tyre P (FIGS. 2 and 3).

The assembly 1 also comprises, in addition to the nozzle 2, a hopper 3 for containing the rubber dust and internally provided with stirring means 4 (arrow f) of the dust itself.

The assembly 1 further comprises conveying means 5 for pneumatically supplying rubber dust to the nozzle 2, said conveying means 5 comprise a pump 6 connected to a venturi tube 7, the latter being disposed under the hopper 3.

A controller 8 can be connected to the venturi tube 7 for the control and regulation of the air flow to the venturi tube 7 itself, and an additional controller 9 for the control and regulation of the air pressure in the venturi tube 7.

The unit U further comprises a suction unit 10 of powder residues falling from the nozzle 2, said assembly 10 being defined by a suction element 11 disposed under the nozzle 2, a suction pump 12 being connected to the element 11, and a discharge container 13 being connected with the suction element 11 through filtering means 14.

As shown in FIG. 2, the nozzle 2 of the unit U and the assembly 10 provided with special protection casing 15, are suitably, directly and advantageously mounted on board of a dispenser assembly G of extruded rubber or compound in a viscous form on the carcass of tyre P.

Said assembly G, which is known and therefore not described here, is suitable for the realization of the known retreading process of the tyre P.

In this way, the automatic distribution and control are performed in a uniform manner, of the rubber dust on retreaded tyres without the risk of dust dispersion in the environment; advantageously, such distribution is made immediately after the application of the extruded rubber.

Furthermore, this automatic application of rubber dust the sidewalls of tyres avoids un undesired "sticking" between tyres placed adjacent to each other during the later stages of production.

The invention claimed is:

1. Distribution unit for distribution carbonaceous particulate material, to be applied on the peripheral surfaces of a tire, comprising:
   a nozzle diffuser for spreading said particulate material;
   a pneumatic supply assembly for feeding said particulate material to said nozzle diffuser; and,
   a suction unit for sucking residues of said particulate material falling from said nozzle diffuser;
   wherein said nozzle diffuser and said suction unit are mounted directly on a dispenser assembly configured for dispensing extruded rubber on peripheral surfaces of a retreated tire; and, wherein said suction unit is so disposed with respect to said nozzle diffuser on said dispenser assembly so as to prevent dispersion of said particulate material.

2. Unit according to claim 1, wherein said pneumatic supply assembly comprises a pneumatic supply hopper containing said particulate material, a Venturi tube coupled to a pump, said tube being disposed below said hopper and connected to said nozzle diffuser.

3. Unit according to claim 2, further comprising a controller for controlling and regulating the air flow applied to said Venturi tube, and for controlling and adjusting the air pressure applied to said Venturi tube.

\* \* \* \* \*